(12) United States Patent
Schmandt et al.

(10) Patent No.: US 11,385,142 B2
(45) Date of Patent: Jul. 12, 2022

(54) MEASURING ARRANGEMENT FOR DETERMINING A PARAMETER OF A FLUID MEDIUM FLOWING THROUGH A FLUID FLOW CHANNEL AND FLUID FLOW CHANNEL HAVING SUCH A MEASURING ARRANGEMENT

(71) Applicant: AUDI AG, Ingolstadt (DE)

(72) Inventors: Bastian Schmandt, Ingolstadt (DE); Christian Rätscher, Lenting (DE); Jürgen Kranz, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 147 days.

(21) Appl. No.: 16/957,893

(22) PCT Filed: Jan. 7, 2019

(86) PCT No.: PCT/EP2019/050253
§ 371 (c)(1),
(2) Date: Jun. 25, 2020

(87) PCT Pub. No.: WO2019/134998
PCT Pub. Date: Jul. 11, 2019

(65) Prior Publication Data
US 2021/0381933 A1 Dec. 9, 2021

(30) Foreign Application Priority Data
Jan. 8, 2018 (DE) .................. 10 2018 200 171.5

(51) Int. Cl.
*G01N 1/22* (2006.01)
*G01N 15/06* (2006.01)
(Continued)

(52) U.S. Cl.
CPC .......... *G01N 1/2247* (2013.01); *G01N 15/06* (2013.01); *G01F 15/185* (2013.01); *G01N 2015/0046* (2013.01)

(58) Field of Classification Search
CPC ................. G01N 1/2247; G01N 15/06; G01N 2015/0046
See application file for complete search history.

(56) References Cited

U.S. PATENT DOCUMENTS 4,131,011 A    12/1978  Ling
4,917,293 A *  4/1990   Fedter ............... B60H 1/00785
                                            454/75

(Continued)

FOREIGN PATENT DOCUMENTS

DE        600 02 044 T2    12/2003
DE    10 2011 077 682 A1   12/2012
(Continued)

OTHER PUBLICATIONS

English-language translation of International Preliminary Report on Patentability dated Jul. 23, 2020, in corresponding International Application No. PCT/EP2019/050253; 9 pages.
(Continued)

*Primary Examiner* — David Z Huang
(74) *Attorney, Agent, or Firm* — Maier & Maier, PLLC

(57) ABSTRACT

A measuring arrangement for determining at least one parameter of a fluid medium flowing through a fluid flow duct. The measuring arrangement includes a probe device designed to be arranged in the flowing medium as a hollow body having an incident flow side closing the cavity of the hollow body, an open discharge flow side, an outer contour, which generates a flow separation on the discharge flow side, for generating a backflow, and a partition wall dividing the cavity into a fluid inflow chamber and a fluid outflow chamber, wherein the fluid inflow chamber includes an inlet
(Continued)

opening and the fluid outflow chamber includes an outlet opening.

20 Claims, 2 Drawing Sheets

(51) Int. Cl.
    *G01F 15/18*     (2006.01)
    *G01N 15/00*     (2006.01)

(56) References Cited

U.S. PATENT DOCUMENTS

| | | |
|---|---|---|
| 2015/0308871 A1 | 10/2015 | Sudou |
| 2016/0131013 A1 | 5/2016 | Yi et al. |
| 2017/0058735 A1 | 3/2017 | Zhang |

FOREIGN PATENT DOCUMENTS

| | | |
|---|---|---|
| DE | 11 2014 002 928 T5 | 3/2016 |
| WO | 00/45163 A2 | 8/2000 |

OTHER PUBLICATIONS

German Examination Report dated May 20, 2019 in corresponding German Application No. 10 2018 200 171.5; 13 pages including Machine-generated Translation.
International Search Report dated Apr. 23, 2019 in corresponding International Application No. PCT/EP2019/050253; 8 pages.
Written Opinion dated Apr. 23, 2019 in corresponding International Application No. PCT/EP2019/050253; 18 pages including Machine-generated Translation.

\* cited by examiner

MEASURING ARRANGEMENT FOR DETERMINING A PARAMETER OF A FLUID MEDIUM FLOWING THROUGH A FLUID FLOW CHANNEL AND FLUID FLOW CHANNEL HAVING SUCH A MEASURING ARRANGEMENT

FIELD

The disclosure relates to a measuring arrangement for determining at least one parameter of a fluid medium flowing through a fluid flow duct, in particular a measuring arrangement having a sensor measuring the fine dust of a fresh air flow of a vehicle climate control system. Furthermore, the invention relates to a fluid flow duct, in particular a pressure duct of a vehicle climate control system having such a measuring arrangement.

BACKGROUND

DE 10 2011 077 682 A1 describes a device for determining at least one parameter of a fluid medium flowing in a main flow direction, for example, intake air in an intake passage of an internal combustion engine of a vehicle. Physical or chemical parameters, in particular flow speed, mass flow, or volume flow are listed as parameters to be determined. In this known device, the incident flow of a sensor occurs in a stagnation point of the fluid flow and thus at high pressure, while the discharge flow takes place on a side wall of the device at low pressure. The sensor volume flow is thus conveyed out of the fluid ambient flow of the device and is thus dependent on the incident flow speed of the device.

If such a device were used to determine the air quality in the air intake of a vehicle climate control system, due to the high air flow speed of up to 10 m/s, the exact sensor value would be dependent on the desired and time-variable amount of air which would be required for the climate control of the vehicle cabin. Moreover, the flow is influenced by the inlet flaps of the air conditioner in dependence on the position of the fresh air flap, so that an inhomogeneous and time-variable incident flow situation exists.

Proceeding therefrom, the invention is based on the object of specifying a measuring arrangement for determining a parameter of a fluid medium flowing through a fluid flow duct, in which a volume flow of the medium to be sensed by a sensor of the measuring arrangement is independent of a variable amount of air through the fluid flow duct.

Such a measuring arrangement for determining at least one parameter of a fluid medium flowing through a fluid flow duct comprises:
  a probe device designed to be arranged in the flowing medium as a hollow body having
    an incident flow side closing the cavity of the hollow body,
    an open discharge flow side,
    an outer contour generating a flow separation on the discharge side for generating a backflow, and
    a partition wall dividing the cavity into a fluid inflow chamber and a fluid outflow chamber, wherein the fluid inflow chamber comprises an inlet opening and the fluid outflow chamber comprises an outlet opening, and
  a sensor arrangement, which is fluidically connected via a fluid supply duct to the inlet opening and via a fluid discharge duct to the outlet opening to create a measurement duct through which the backflow flows.

Using this probe device as a passive component of the measuring arrangement, a flow of the fluid medium, for example, air, at the inlet opening of the fluid inflow chamber and at the outlet opening of the fluid outflow chamber is ensured having constant volume flow independent of the flow conditions inside the fluid flow duct.

The sensor accuracy is increased by providing such a constant volume flow as a sensor volume flow for the sensor arrangement via the fluid supply duct connected to the inlet opening of the fluid inflow chamber, without control or regulation for setting a constant volume flow being required for this purpose.

This probe device is a hollow body having a closed incident flow side and an open discharge flow side and comprises an outer contour which, in the trailing region, i.e., in the wind shadow of the hollow body, results in a separation of the flow of the fluid medium. In the separation area thus resulting in the region of the open discharge side of the hollow body, flow eddies or turbulence arise with the result that a chronologically fixed separation flowline does not exist between the separation region and the ambient flow of the probe device, whereby a sufficient exchange takes place between the separation area and the incident flow and thus a backflow arises into the open discharge flow side of the hollow body.

In such a probe device, a direct incident flow of the inlet opening and the outlet opening is avoided, since they are located in the separation area of the open discharge flow side of the hollow body and no interference of the flow takes place there. A direct incident flow of an inlet opening and an outlet opening would result in increased pressure due to the accumulation and thus unfavorable influence on the through flow behavior of a sensor. Without regulating the volume flow, an accumulation on an inlet opening would increase the volume flow, while an accumulation on the outlet opening would reduce the volume flow.

A disadvantageous interaction between the intake of the fluid medium and its subsequent recirculation after the measurement through the sensor arrangement is avoided by the partition wall dividing the cavity of the hollow body into a fluid inflow chamber and a fluid outflow chamber, since a direct incident flow of the inlet opening by the outlet jet leaving the outlet opening is prevented by the partition wall.

To ensure a separation area having sufficient backflow, it is advantageous to form the hollow body having a high flow resistance to the fluid medium, in particular having a high pressure resistance.

To ensure particularly effective separation of the fluid flow along the circumferential surface of the hollow body, it is specified according to a refinement that
  the discharge flow side of the hollow body forms a discharge flow plane oriented perpendicular to the flow direction of the following fluid medium, and
  the discharge flow plane forms, with a circumferential surface of the hollow body extending in the flow direction, an edge resulting in the separation of the flowing medium.

Furthermore, it is particularly advantageous to form the hollow body as a blunt hollow body, to thus implement a high flow resistance and/or a high pressure resistance.

It has proven to be particularly advantageous here to form the hollow body as pot-shaped having a cylindrical circumferential wall and a pot base forming the incident flow side.

The sensor arrangement is preferably formed having a sensor measuring the air quality of air as the fluid medium, in particular as a fine dust sensor.

The measuring arrangement can advantageously be used for vehicle climate control systems, in which the fluid flow duct is formed as a fresh air duct of the vehicle climate control system having a measuring arrangement according to the invention.

BRIEF DESCRIPTION OF THE DRAWINGS

Further advantages, features, and details of the invention result from the drawings, the following description of preferred embodiments, and on the basis of the drawings. In the figures.

DETAILED DESCRIPTION

Figure 1:
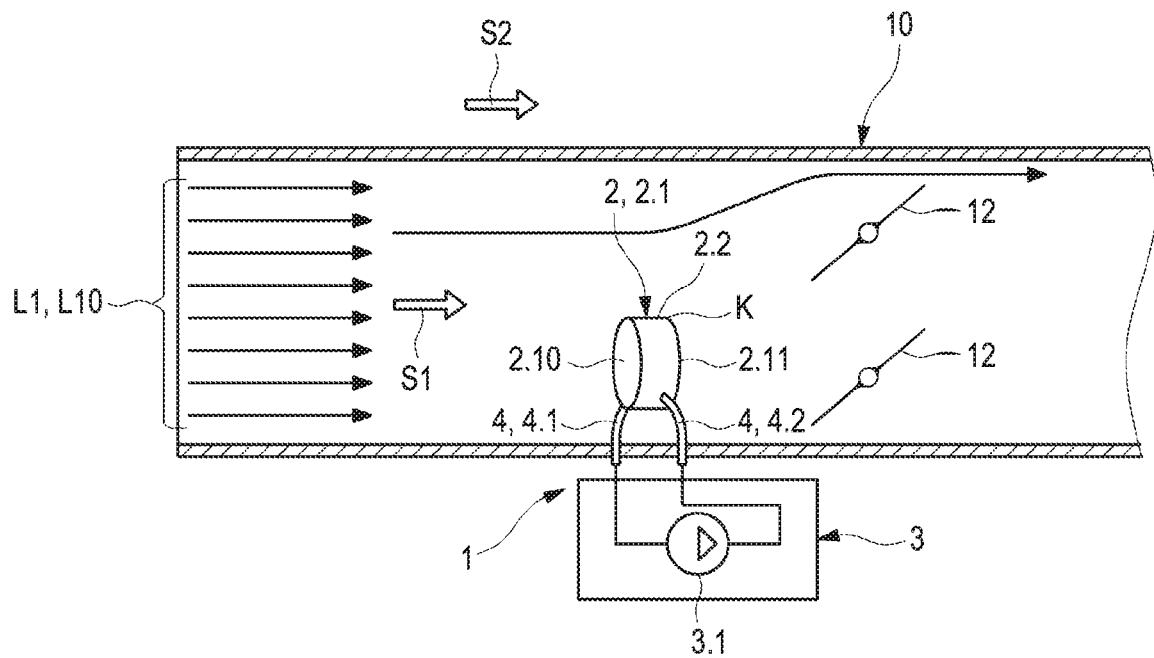
FIG. 1 shows a schematic illustration of a measuring arrangement having a probe device and a sensor arrangement according to the invention in a fresh air duct of a vehicle climate control system.

FIG. 1 shows a fluid flow duct 10 of a vehicle climate control system formed as a fresh air duct, which is equipped with a measuring arrangement 1, consisting of a probe device 2 and a sensor arrangement 3. The probe device 2 is subjected here to a fluid medium L1 flowing into the fluid flow duct 10 in direction S1, which represents an air flow L10, namely a fresh air flow, which is guided in direction S2 via adjustable fresh air control flaps 12 into an air conditioner of the vehicle climate control system.

The probe device 2 is designed as a passive component such that a constant sensor volume flow branches off from the air flow L10 independently of the fluid-dynamic states prevailing inside the fluid flow duct 10 and is supplied via a measuring duct 4 to a sensor arrangement 3 having a sensor 3.1 as a fine dust sensor and is recirculated into the fluid flow duct 10.

This probe device 2 is formed as a hollow body 2.1 having an incident flow side 2.10 and a discharge flow side 2.11, wherein this hollow body 2.1 is arranged in the fluid flow duct 10 in such a way that the incident flow side 2.10 is oriented upstream in relation to the flow direction S1 and the discharge flow side 2.11 is oriented downstream in relation to the flow direction S1.

The hollow body 2.1 of the probe device 2 is embodied as pot-shaped having a pot base 2.22 and a cylindrical circumferential wall 2.21, so that the pot base 2.22 forms the incident flow side 2.10 and thus closes the cavity 2.3 of the hollow body 2.1, while the opposite side is open as the discharge flow side 2.11.

Figure 2:
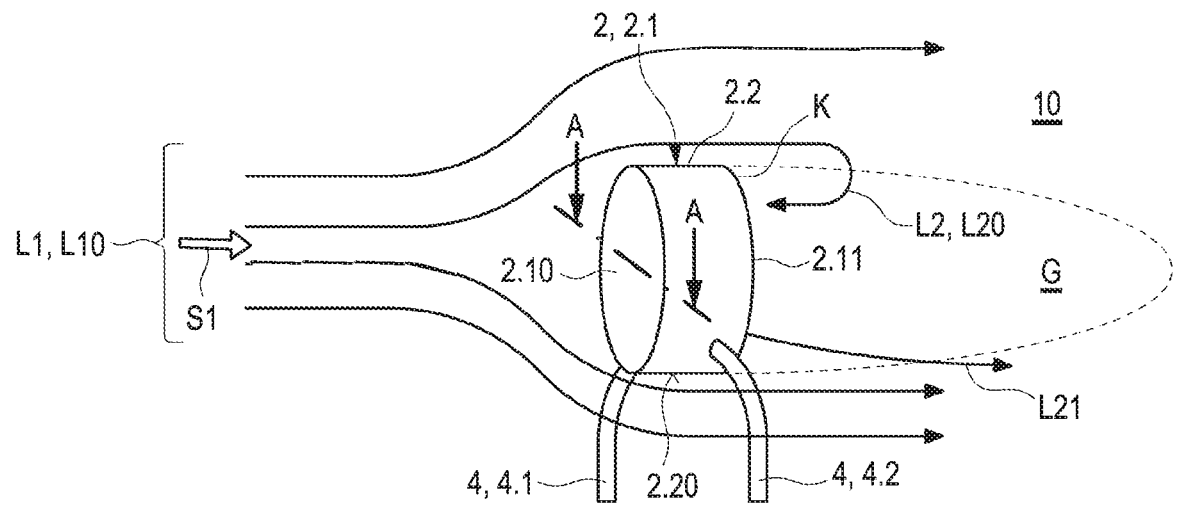
FIG. 2 shows a schematic illustration of the probe device according to FIG. 1 with a flow profile of a fluid medium.
Figure 3:
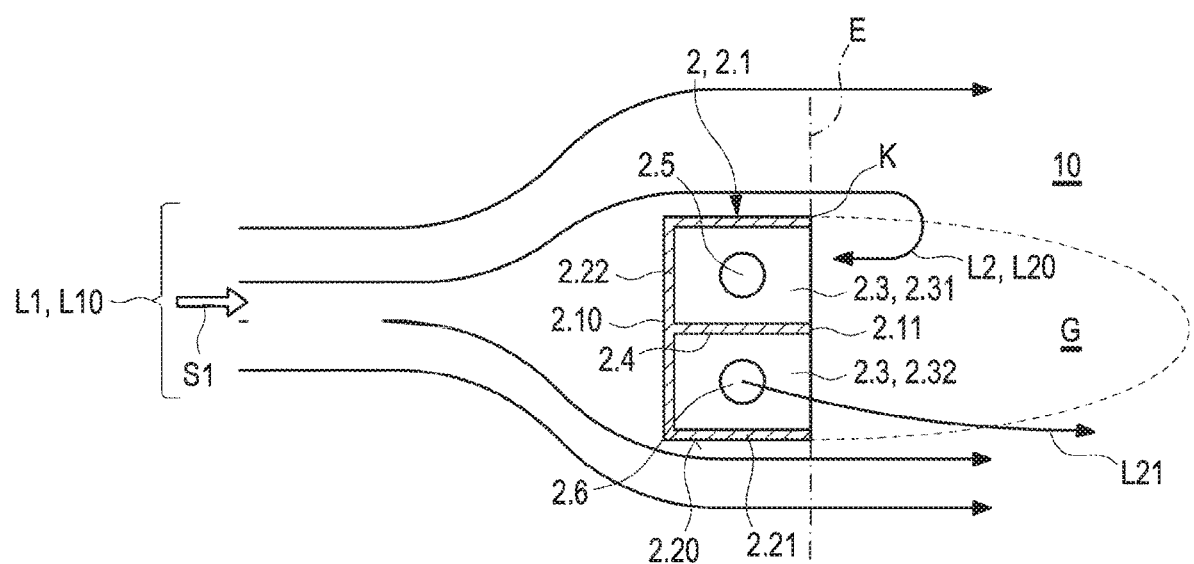
FIG. 3 shows a sectional illustration of the probe device according to section A-A in FIG. 2.

The air flow L10 is incident on the incident flow side 2.10 corresponding to FIGS. 2 and 3 and, due to the outer contour 2.2 of the hollow body 2.1 in the resulting trailing area, leads to a flow separation on the discharge flow side 2.11 while forming a separation area G.

The hollow body 2.1 therefore has an outer contour 2.2 which results in this flow separation. For this purpose, the hollow body 2.1 has a high flow resistance and/or a high pressure resistance and is embodied as a blunt hollow body 2.1.

The flow separation is achieved by an unevenly extending outer contour 2.2 of the hollow body 2.1 in the region of the discharge flow side 2.11. A geometry-induced flow separation is thus provided. The discharge flow side 2.11 of the hollow body 2.1 is perpendicular to the flow direction S1 of the supply air flow L10 and forms a discharge flow plane E, which, with a circumferential surface 2.20 of the cylindrical circumferential wall 2.21, forms an edge K which causes a separation of the supply air flow L10.

Flow eddies or turbulence arise in the separation area G with the result that a chronologically fixed separation flow line does not exist between the separation area G and the ambient flow of the probe device 2, whereby a sufficient exchange takes place between the separation area G and the incident flow and thus a backflow L2 arises into the open discharge flow side 2.11 of the hollow body 2.1, i.e., thus into its cavity 2.3. Pollutants of the exhaust air flow L10 can thus also be measured in the separation area G.

According to FIG. 3, the cavity 2.3 of the hollow body 2.1 is divided by means of a partition wall 2.4 into a fluid inflow chamber 2.31 and a fluid outflow chamber 2.32. The fluid inflow chamber 2.31 comprises an inlet opening 2.5, while the fluid outflow chamber comprises an outlet opening 2.6, wherein both the inlet opening 2.5 and also the outlet opening 2.6 are arranged in the circumferential wall 2.21 of the hollow body 2.1. The inlet opening 2.5 is connected via a fluid supply duct 4.1 as part of the measuring duct 4 to the sensor 3.1, via which the backflow L2, as air flow L20 flowing into the fluid inflow chamber 2.31, is recirculated to the sensor 3.1 and subsequently via a fluid exhaust duct 4.2, which connects the sensor 3.1 to the outlet opening 2.6, back into the fluid outflow chamber 2.32 and subsequently is guided back into the fluid flow duct 10 as ambient air flow L21 flowing in circulation out of the fluid outflow chamber 2.32 (cf. FIGS. 2 and 3).

The partition wall 2.4 avoids interactions between the air intake via the inlet opening 2.5 and the subsequent injection after the measurement via the outlet opening 2.6 back into the fluid flow duct 10.

The inlet and outlet opening 2.5 and 2.6 are arranged spatially close to one another so as not to strain a fan of the sensor 3.1 due to a high pressure difference and to avoid a negative effect of the sensor volume flow resulting therefrom.

Using such a measuring arrangement 1 in a fluid flow duct 10 of a vehicle climate control system, the fine dust concentration of the air flow L10 supplied as a fresh air flow is ascertained, wherein the air flow L20 of the backflow L2 taken in via the inlet opening 2.5 is supplied as a sensor volume flow to the sensor 3.1 as the air quality sensor independently of the operating conditions inside the fluid flow duct 10 and thus as a constant volume flow.

The invention claimed is:

1. A measuring arrangement for determining at least one parameter of a fluid medium flowing through a fluid flow duct, comprising:
   a probe device designed to be arranged in the flowing medium as a pot-shaped hollow body including
      a circumferential wall surrounding a cavity,
      an incident flow side closing the cavity of the hollow body, wherein the incident flow side forms a closed base of the pot-shaped hollow body,
      an open discharge flow side,
      an outer contour, which generates a flow separation on the discharge flow side for generating a backflow, and
      a partition wall dividing the cavity into a fluid inflow chamber and a fluid outflow chamber, wherein the fluid inflow chamber comprises an inlet opening disposed through the circumferential wall and the fluid outflow chamber comprises an outlet opening disposed through the circumferential wall, and a sensor arrangement which is fluidically connected via a fluid supply duct to the inlet opening and via a fluid exhaust duct to the outlet opening to create a measuring duct through which the backflow flows.

2. The measuring arrangement as claimed in claim 1, in which the hollow body is configured to create high flow resistance to the fluid medium.

3. The measuring arrangement as claimed in claim 2, in which the hollow body is formed as a blunt hollow body.

4. The measuring arrangement as claimed in claim 2, in which the hollow body is designed as pot-shaped having a cylindrical circumferential wall and a pot base forming the incident flow side.

5. The measuring arrangement as claimed in claim 2, in which the sensor arrangement is formed having a sensor measuring the air quality of air as the fluid medium.

6. The measuring arrangement as claimed in claim 1, in which the hollow body is configured to create high pressure resistance to the fluid medium.

7. The measuring arrangement as claimed in claim 6, in which the hollow body is formed as a blunt hollow body.

8. The measuring arrangement as claimed in claim 6, in which the hollow body is designed as pot-shaped having a cylindrical circumferential wall and a pot base forming the incident flow side.

9. The measuring arrangement as claimed in claim 6, in which the sensor arrangement is formed having a sensor measuring the air quality of air as the fluid medium.

10. The measuring arrangement as claimed in claim 1, wherein the discharge flow side of the hollow body forms a discharge flow plane oriented perpendicularly to the flow direction of the flowing fluid medium, and the discharge flow plane forms, with a circumferential surface of the hollow body extending in the flow direction, an edge resulting in the separation of the flowing medium.

11. The measuring arrangement as claimed in claim 10, in which the hollow body is formed as a blunt hollow body.

12. The measuring arrangement as claimed in claim 10, in which the hollow body is designed as pot-shaped having a cylindrical circumferential wall and a pot base forming the incident flow side.

13. The measuring arrangement as claimed in claim 10, in which the sensor arrangement is formed having a sensor measuring the air quality of air as the fluid medium.

14. The measuring arrangement as claimed in claim 1, in which the hollow body is formed as a blunt hollow body.

15. The measuring arrangement as claimed in claim 14, in which the sensor arrangement is formed having a sensor measuring the air quality of air as the fluid medium.

16. The measuring arrangement as claimed in claim 1, in which the hollow body is designed as pot-shaped having a cylindrical circumferential wall and a pot base forming the incident flow side.

17. The measuring arrangement as claimed in claim 16, in which the sensor arrangement is formed having a sensor measuring the air quality of air as the fluid medium.

18. The measuring arrangement as claimed in claim 1, in which the sensor arrangement is formed having a sensor measuring the air quality of air as the fluid medium.

19. The measuring arrangement as claimed in claim 18, in which the sensor is formed as a fine dust sensor.

20. A fluid flow duct, in which the fluid flow duct is formed as a fresh air duct of a vehicle climate control system comprising:

a measuring arrangement for determining at least one parameter of a fluid medium flowing through the fluid flow duct, comprising a probe device designed to be arranged in the flowing medium as a pot-shaped hollow body including a circumferential wall surrounding a cavity, an incident flow side closing the cavity of the hollow body, wherein the incident flow side forms a closed base of the pot-shaped hollow body, an open discharge flow side, an outer contour, which generates a flow separation on the discharge flow side for generating a backflow, and a partition wall dividing the cavity into a fluid inflow chamber and a fluid outflow chamber, wherein the fluid inflow chamber comprises an inlet opening disposed through the circumferential wall and the fluid outflow chamber comprises an outlet opening disposed through the circumferential wall, and a sensor arrangement which is fluidically connected via a fluid supply duct to the inlet opening and via a fluid exhaust duct to the outlet opening to create a measuring duct through which the backflow flows.

* * * * *